United States Patent
Ante et al.

(10) Patent No.: US 9,555,362 B2
(45) Date of Patent: Jan. 31, 2017

(54) METHOD FOR SEPARATING ARSENIC AND HEAVY METALS IN AN ACIDIC WASHING SOLUTION

(71) Applicant: EISENMANN AG, Böblingen (DE)

(72) Inventors: Angela Ante, Hilchenbach (DE); Marc-Peter Hofmann, Taunusstein (DE)

(73) Assignee: EISENMANN AG, Boeblingen (DE)

( * ) Notice: Subject to any disclaimer, the term of this patent is extended or adjusted under 35 U.S.C. 154(b) by 0 days.

(21) Appl. No.: 14/364,372

(22) PCT Filed: Oct. 26, 2012

(86) PCT No.: PCT/EP2012/004481
§ 371 (c)(1),
(2) Date: Jun. 11, 2014

(87) PCT Pub. No.: WO2013/091749
PCT Pub. Date: Jun. 27, 2013

(65) Prior Publication Data
US 2014/0339468 A1    Nov. 20, 2014

(30) Foreign Application Priority Data
Dec. 20, 2011  (DE) .................... 10 2011 121 638

(51) Int. Cl.
| | | |
|---|---|---|
| C01G 28/00 | (2006.01) |
| B01D 53/14 | (2006.01) |
| C02F 1/72 | (2006.01) |
| C01B 17/90 | (2006.01) |
| C01G 3/12 | (2006.01) |
| C22B 15/00 | (2006.01) |
| C02F 101/10 | (2006.01) |
| C02F 101/20 | (2006.01) |

(52) U.S. Cl.
CPC ......... *B01D 53/1425* (2013.01); *C01B 17/901* (2013.01); *C01B 17/907* (2013.01); *C01G 3/12* (2013.01); *C01G 28/008* (2013.01); *C02F 1/722* (2013.01); *C22B 15/0091* (2013.01); *C02F 2101/103* (2013.01); *C02F 2101/20* (2013.01)

(58) Field of Classification Search
USPC .................................................. 423/1, 87, 37
IPC ............ C01G 28/008,3/12; C02F 1/722; C01B 17/901, 17/907; C22B 15/0091; B01D 53/1425
See application file for complete search history.

(56) References Cited

U.S. PATENT DOCUMENTS

2009/0022639 A1 * 1/2009 Poijarvi et al. ............... 423/24
2010/0215570 A1   8/2010 Abuyima et al.

FOREIGN PATENT DOCUMENTS

| CA | 1 257 765 A | 5/1985 |
| DE | 34 18 241 A1 | 11/1985 |
| EP | 2 177 477 A1 | 4/2010 |
| JP | 10237560 A * | 9/1998 |

OTHER PUBLICATIONS

Translation of JP 10237560A, Sep. 1998.*
"Arsenic—a Review. Part II: Oxidation of Arsenic and its Removal in Water Treatment," Monique Bissen et al., Acta hyrdochim. hydrobiol. 31 (2003) 2, 97-107.

* cited by examiner

*Primary Examiner* — Steven Bos
(74) *Attorney, Agent, or Firm* — Factor Intellectual Property Law Group, Ltd.

(57) ABSTRACT

A method for separating arsenic and heavy metals in an acidic washing solution which contains both arsenic and heavy metal, more particularly in a washing solution which is formed in copper smelting and contains sulphuric acid, comprises a separation process section, in which arsenic and at least one primary heavy metal are separated from one another. The separation process section comprises a processing step, in which hydrogen peroxide $H_2O_2$ is added to the washing solution, and the separation process section comprises a precipitation stage, in which the washing solution is admixed with a sulphide precipitation reagent, causing the at least one primary heavy metal to precipitate in the form of a metal sulphide. The processing step in this system is carried out before the precipitation stage.

12 Claims, 1 Drawing Sheet

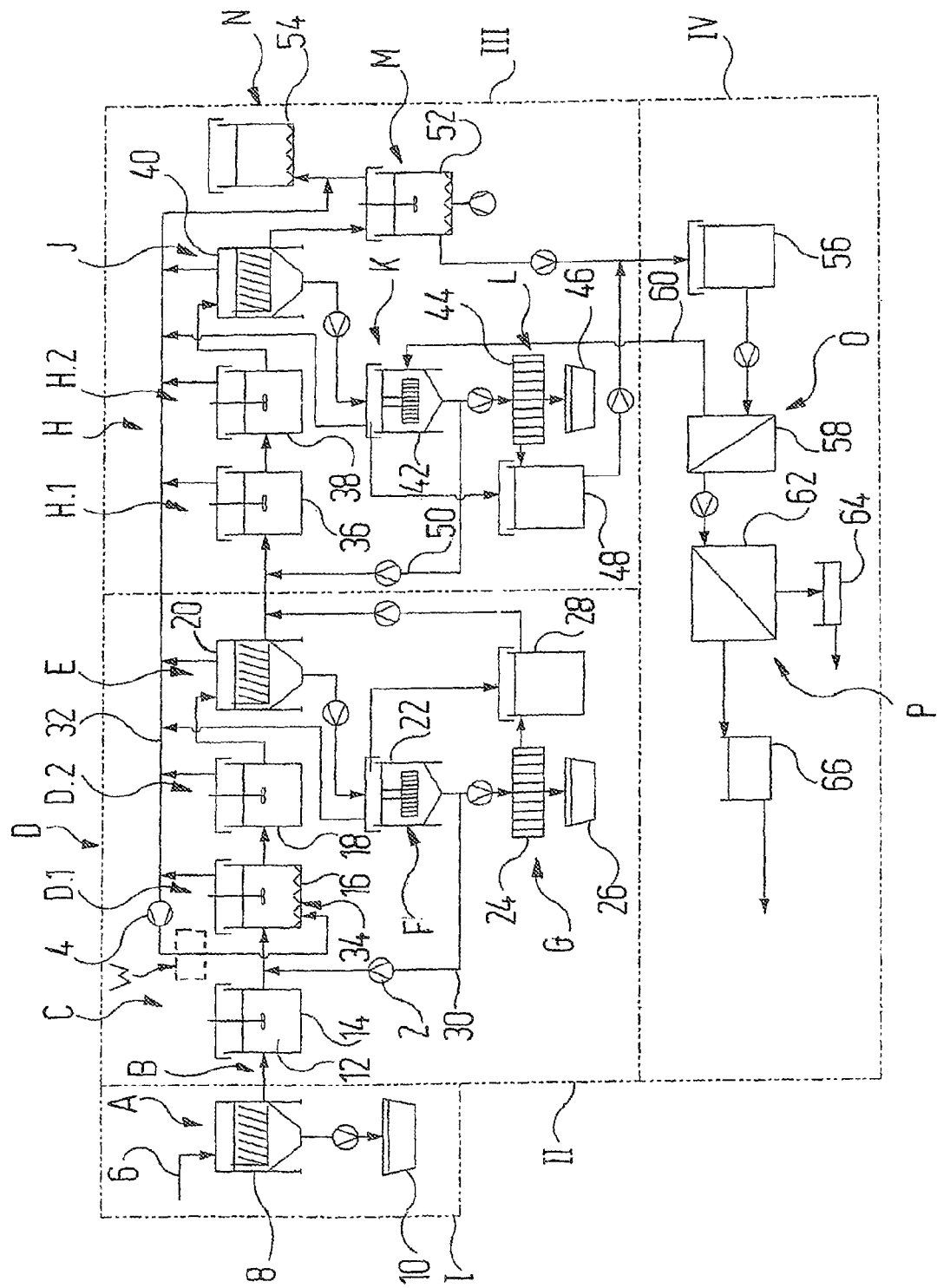

METHOD FOR SEPARATING ARSENIC AND HEAVY METALS IN AN ACIDIC WASHING SOLUTION

RELATED APPLICATIONS

This application is a national phase of International Patent Application No. PCT/EP2012/004481, filed Oct. 26, 2012, which claims the filing benefit of German Patent Application No. 10 2011 121 638.7, filed Dec. 20, 2011, the contents of both of which are incorporated herein by reference.

FIELD OF THE INVENTION

The invention relates to a method for separating arsenic and heavy metals in an acidic washing solution containing both arsenic and heavy metals, especially in a washing solution containing sulfuric acid as obtained in copper smelting, the method comprising a separation stage in which arsenic and at least one primary heavy metal are separated from each other.

Primary heavy metal is simply intended here to denote the heavy metal whose separation from arsenic is being considered; the washing solution can also contain additional heavy metals other than the primary heavy metal. The invention is exemplified hereafter with washing acids such as those obtained in copper smelting follow-up processes and containing the valuable metal copper as the primary heavy metal of particular interest. However, heavy metals other than copper can also be of interest and may also be present in washing solutions containing acids other than sulfuric acid.

BACKGROUND OF THE INVENTION

Sulfur-containing flue gases are obtained in copper smelting and are subjected to a flue gas treatment known per se in which the sulfur present is converted to sulfuric acid; the impurities present end up being collected in a washing solution containing sulfuric acid, i.e. so-called washing acid, in which the sulfuric acid concentrations can be between 5% and 35%. Accordingly, the washing acid can have a negative pH. Apart from copper, such a washing acid contains other (heavy) metals, like zinc, cadmium, molybdenum, lead and mercury, as well as other impurities, like arsenic in particular.

Arsenic is an environmental toxin, so one is constantly striving to treat residual or waste materials that arise, such as said washing acids, to free them as far as possible of arsenic and its compounds. It is known e.g. to precipitate arsenic from washing acids as sulfide for this purpose.

DE 34 18 241 A1, for example, discloses a method for removing arsenic from waste sulfuric acids, wherein an aqueous solution of sodium sulfide, $NaS_2$, and sodium hydrogen sulfide, NaHS, in which the amount of sodium sulfide is in stoichiometric excess relative to the arsenic content of the waste sulfuric acid, is used in a hydrogen sulfide atmosphere as a sulfidizing agent.

In such precipitation reactions, copper present in the washing acid is also precipitated as sulfide, which is then disposed of together with the arsenic sulfide and is thus lost.

In the review article "Arsenic—a Review. Part II: Oxidation of Arsenic and ist Removal in Water Treatment", Monique Bissen et al., *Acta hydrochim. hydrobiol.* 31 (2003) 2, 97-107, the authors give detailed attention to the oxidation of arsenic and its removal in water treatment, dealing not with sulfide precipitation but with other precipitation reactions, e.g. treatment with $FeCl_3$ at pH 7. However, the article states that As(III) is generally more difficult to remove than As(V) because As(V) precipitates more rapidly than As(III).

SUMMARY OF THE INVENTION

An object of the invention is to provide a method of the type mentioned at the outset which affords an efficient separation of arsenic and at least one heavy metal in the washing solution, making it possible to isolate the heavy metal with a good purity in respect of arsenic so that it can be used as a valuable material or processed for this purpose.

This object may be achieved in a method of the type mentioned at the outset wherein a) the separation stage comprises a processing step in which hydrogen peroxide, $H_2O_2$, is added to the washing solution; and b) the separation stage comprises a precipitation step in which a sulfide precipitating reagent is added to the washing solution in order to precipitate the at least one heavy metal as metal sulfide, c) the processing step being carried out before the precipitation step, Thus, according to the invention, hydrogen peroxide, $H_2O_2$, is added to the acidic washing solution first, and only then is a sulfide precipitation for the primary heavy metal initiated by adding a sulfide precipitating reagent.

Contrary to prevailing understanding, it was recognized according to the invention that, if hydrogen peroxide, $H_2O_2$, is added beforehand, arsenic remains substantially in solution even when the sulfide precipitating reagent is added, and does not precipitate together with the primary heavy metal. It is generally believed that hydrogen peroxide, $H_2O_2$, oxidizes As(III) to As(V), which then unwantedly precipitates more easily with the primary heavy metal—thus it is generally believed that, if hydrogen peroxide, $H_2O_2$, is added before the sulfide precipitating reagent, a separation of arsenic and the primary heavy metal is actually more difficult.

In practice, however, a 100% separation could in fact be achieved in this way in the sense that no arsenic precipitates with the primary heavy metal.

A separation of arsenic and the primary heavy metal that is tailored to the arsenic content of the washing solution is advantageously achieved if a) before the processing step, an analysis of the washing solution, at least in respect of the arsenic content, is performed in an analysis step; and b) hydrogen peroxide, $H_2O_2$, is added in stoichiometric proportion relative to the determined arsenic content of the washing solution.

The processing is favoured if, after the precipitation step, at least one separation step is carried out in which the precipitated primary heavy metal is separated from the washing solution.

If an intermediate containing primary heavy metal, obtained after the at least one separation step, is recycled into the precipitation step, the mean particle size of the precipitated compounds can be increased by introducing seeds, thereby enhancing the dewaterability of the sulfide sludge separated off. Moreover, this measure optimizes the utilization of the reagents used.

If the washing solution obtained after the at least one separation step is freed of arsenic in an arsenic sedimentation stage, it becomes possible for the acid present in the washing solution to be recovered as a valuable material.

In addition, it is advantageous if the arsenic sedimentation stage comprises an arsenic precipitation step in which a sulfide precipitating reagent is added to the washing solution in order to precipitate the arsenic as arsenic sulfide.

It is again favourable if, after the arsenic precipitation step, at least one arsenic separation step is carried out in which the precipitated arsenic is separated from the washing solution.

Analogously to the intermediate containing primary heavy metal, it is advantageous if an arsenic-containing intermediate obtained after the at least one arsenic separation step is recycled into the arsenic precipitation step.

To recover acid present in the washing solution, it is favourable if the washing solution obtained after the at least one arsenic separation step is subjected to a nanofiltration in a nanofiltration stage.

To save sulfide precipitating reagent, it is advantageous if hydrogen sulfide from at least one of the process steps in which it is liberated is recycled as sulfide precipitating reagent into the precipitation step of the separation stage.

As hydrogen sulfide is toxic and can form explosive mixtures with air, it can be favourable if hydrogen sulfide from at least one of the process steps in which it is liberated is fed into a washing step where it is converted to a sulfide precipitating reagent which is fed into the precipitation step of the separation stage.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the separation method according to the invention is illustrated in greater detail below with the aid of the single FIGURE schematically depicting the separation method.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The FIGURE shows several pumps and blowers of which, for the sake of clarity, only one pump is denoted by 2 and only one blower is denoted by 4. Transfer lines are depicted by arrows in the separation scheme, the direction of the arrows indicating the particular direction of transfer. Likewise for the sake of clarity, individual labelling of the transfer lines has been extensively omitted, with the exception of lines that are particularly worthy of mention.

In a stage denoted by I a pretreatment takes place in which a washing acid obtained in the flue gas treatment mentioned at the outset is first prepared for the separation of arsenic and copper. In particular, for example, dust particles and undissolved arsenic trioxide particles entrained by the washing acid can be precipitated using precipitation aids such as those known per se, and separated off. This is done in a sedimentation or filtration step A by feeding the washing acid into a filtration unit 8 via a feed line 6. The sedimented solids are transferred to a collecting tank 10, from which they are disposed of. The resulting filtrate then forms the washing acid 12 in which arsenic is to be separated from copper. Its composition is determined in an analysis step B, at least in respect of the arsenic and copper contents and, in the present exemplary embodiment, also in respect of the sulfuric acid concentration. Usually, washing acids such as those considered here have a sulfuric acid content of between 5% and 35% and an arsenic content of between 3 g/l and 18 g/l. The copper content is normally in the order of between 0.3 g/l and 12 g/l.

Apart from the filtration step A, the pretreatment stage I can also comprise other treatment steps, although this is of no further interest here.

The washing acid 12 freed of dust is then fed into a stage II, in which arsenic and copper are separated from each other. In this separation stage II the washing acid 12 is first pumped into a processing reactor 14, where hydrogen peroxide, $H_2O_2$, is added, with stirring, in a processing step C. Hydrogen peroxide, $H_2O_21$, is added in stoichiometric proportion relative to the arsenic content of the washing acid determined in the analysis step B.

After an appropriate residence time in the processing reactor 14, the washing acid is then transferred to a two-part heavy metal precipitation step in the form of a copper precipitation step D. In the present exemplary embodiment this comprises a first copper precipitation reactor 16 and a second copper precipitation reactor 18. In the first copper precipitation reactor 16 a sulfide precipitating reagent for precipitation of the copper as sulfide is initially added to the washing acid, with stirring, in a first copper precipitation step D.1. The precipitating reagent used in practice is inorganic sulfide, e.g. sodium hydrogen sulfide, NaHS, but other sulfide precipitating reagents, e.g. disodium sulfide, are also considered. It is also possible to use hydrogen sulfide, which for its part can also be generated by means of bacteria that produce it, in a manner known per se.

In the first copper precipitation reactor 16 a coarse preliminary precipitation of the copper sulfide, CuS, takes place, meaning that the washing acid present therein after the addition of the precipitating reagent still contains dissolved copper. The washing acid containing the dissolved copper is transferred together with the precipitated copper sulfide, CuS, to the second copper precipitation reactor 18, where a precipitation of the residual copper present in the washing acid, adapted to stoichiometric proportions, then takes place, with stirring, in a second copper precipitation step D.2, the precipitating reagent being added in the appropriate smaller dose. The complete precipitation of the copper as copper sulfide can be monitored e.g. via the conductivity of the washing acid, the precipitation of the copper as sulfide having ended when the conductivity rises abruptly.

The arsenic present in the washing acid remains substantially in solution; optimal precipitation results could be achieved in which the arsenic remained completely in solution and the separation of arsenic and copper reached 100%.

The washing acid/copper sulfide mixture now present in the second copper precipitation reactor 18 subsequently passes through three separation steps E, F and G, in which, in particular, the precipitated copper is separated from the washing acid. It may be sufficient to have just two separation steps or only a single separation step. In the present exemplary embodiment the washing acid/copper sulfide mixture is initially introduced into a filtration step E, where the resulting copper sludge is separated off by means of a sedimentation or filtration unit 20. If appropriate, flocculation aids can be added to the mixture upstream of the filtration unit 20, in a manner known per se. In a thickening step F the copper sludge is collected in a sludge buffering tank 22 and thickened. After passing through a dewatering step G, where the thickened copper sludge is dewatered in a dewatering unit 24, the copper sulfide is collected in a collecting tank 26, from which it can be reused as a secondary copper product in copper production. The present method thus makes it possible to recover the valuable material copper from washing acid.

The filtrate obtained in the thickening step F and the filtrate obtained in the dewatering step G are conveyed to a common collecting tank 28, from which they are combined with the filtrate from the filtration step E and introduced into a sedimentation stage III, where a sedimentation of entrained arsenic takes place and the washing acid is freed of arsenic.

Part of the copper sludge obtained downstream of the thickening step F can be circulated as a copper-containing intermediate to the first copper precipitation reactor 16 of the copper precipitation step D; this is depicted by a return line 30. As explained at the outset, this introduces seeds into the first copper precipitation reactor 16, thereby increasing the mean particle size of the precipitated compounds and enhancing the dewaterability of the sulfide sludge separated off. Moreover, the utilization of the reagents used is optimized.

Hydrogen sulfide, $H_2S$, is normally formed in the first copper precipitation reactor 16 and the second copper precipitation reactor 18, as well as in the filtration unit 20 and the sludge buffering tank 22. This is fed in each case into a collecting line 32, via which the hydrogen sulfide obtained is conveyed to jets 34 at the bottom of the first copper precipitation reactor 16, which blow the hydrogen sulfide into the washing acid present in said reactor. This makes it possible to save sulfide precipitating reagent in the continuous process. Expressed in general terms, hydrogen sulfide from at least one of the process steps D, E, F in which it is liberated is recycled as sulfide precipitating reagent into the copper precipitation step D of the separation stage II.

Hydrogen sulfide, $H_2S$, forms flammable mixtures with air over an explosive range of between about 4.3 vol % and 45.5 vol %, based on hydrogen sulfide. Therefore, in one modification, a washing step W for the recycled hydrogen sulfide, $H_2S$, can be provided; this is shown by dashes in the collecting line 32 and is located in practice between the first copper precipitation reactor 16 and the blower 4 in the collecting line 32.

In the washing step W the hydrogen sulfide, $H_2S$, is converted to a sulfide precipitating reagent, which can be introduced into the precipitation step D of the separation stage II.

This is done in the washing step W by passing the hydrogen sulfide, $H_2S$, through e.g. sodium hydroxide solution, NaOH, to produce sodium hydrogen sulfide, NaHS. This is then fed as sulfide precipitating reagent, in the form of an aqueous solution, into the first copper precipitation reactor 16. Other washing processes in which $H_2S$ is converted to a suitable sulfide precipitating reagent are also considered.

In other modifications, not specifically shown, hydrogen sulfide, $H_2S$, can be washed not only more or less directly upstream of the first copper precipitation step D, but also directly at the process steps D, E, F in which hydrogen sulfide is liberated and each of which can be equipped with its own washing step W for this purpose.

In the sedimentation stage III the washing acid freed of copper then arrives at an arsenic precipitation step H, again in two parts, which comprises a first arsenic precipitation reactor 36 and a second arsenic precipitation reactor 38. In the first arsenic precipitation reactor 36 a precipitating reagent for precipitation of the arsenic as sulfide is initially added to the washing solution, with stirring, in a first arsenic precipitation step H.1. Again the precipitating reagent is in practice sodium hydrogen sulfide, NaHS. Other sulfide precipitating reagents, e.g. disodium sulfide, are also considered here. It is also possible, if appropriate, to use hydrogen sulfide, which may be inorganic or biologically generated.

In the first arsenic precipitation reactor 36, analogously to the copper precipitation procedure, a coarse preliminary precipitation of the arsenic sulfide initially takes place, meaning that the washing acid present therein after the addition of the precipitating reagent still contains dissolved arsenic. The washing acid containing the dissolved arsenic is transferred together with the precipitated copper sulfide to the second arsenic precipitation reactor 38, where a precipitation of the residual arsenic present in the washing acid, adapted to stoichiometric proportions, then takes place in a second arsenic precipitation step H.2, the precipitating reagent being added in the appropriate smaller dose. The complete precipitation of the arsenic as arsenic sulfide can again be monitored via the conductivity of the washing acid, the precipitation of the arsenic as sulfide having ended when the conductivity rises abruptly.

The washing acid/arsenic sulfide mixture now present in the second arsenic precipitation reactor 38 subsequently passes through three separation steps J, K and L, in which, in particular, the precipitated arsenic is separated from the washing acid. Here again, it may be sufficient to have only two separation steps or just a single separation step. In the present exemplary embodiment the washing acid/arsenic sulfide mixture is introduced into a filtration step J, where the resulting arsenic sludge is separated off by means of a filtration unit 40. If appropriate, flocculation aids can also be added to this mixture upstream of the filtration unit 40, in a manner known per se. In a thickening step K the resulting arsenic sludge is collected in a sludge buffering tank 42 and thickened. After passing through a dewatering step K, where the thickened arsenic sludge is dewatered in a dewatering unit 44, the arsenic sulfide is collected in a collecting tank 46, from which it can be disposed of.

The filtrate obtained in the thickening step K and the filtrate obtained in the dewatering step L are conveyed to a common collecting tank 48.

Part of the arsenic sludge obtained downstream of the thickening step K can be circulated as an arsenic-containing intermediate to the first arsenic precipitation reactor 36 of the arsenic precipitation step H; this is depicted by a return line 50 and serves the same purpose as that explained above regarding part of the copper sludge obtained downstream of the thickening step F.

Hydrogen sulfide, $H_2S$, is also formed in the first arsenic precipitation reactor 36 and the second arsenic precipitation reactor 38, as well as in the filtration unit 40 and the sludge buffering tank 42. This is again fed in each case into the collecting line 32, via which the hydrogen sulfide obtained is conveyed to the jets 34 at the bottom of the first copper precipitation reactor 16 of the separation stage II, which blow the hydrogen sulfide into washing acid present in said reactor. Again expressed in general terms, hydrogen sulfide from at least one of the process steps H, J, K in which it is liberated is thus also recycled as sulfide precipitating reagent into the copper precipitation step D of the separation stage II. This can take place in addition to or as an alternative to the process steps D, E, F of the separation stage II.

In the modification illustrated above, the hydrogen sulfide, $H_2S$, formed in the process step H, J or K can also be passed through the washing step W. Here again, in other modifications, not specifically shown, a separate washing step W can be provided directly at each of the process steps H, J, K in which hydrogen sulfide is liberated.

The filtrate from the filtration step J of the sedimentation stage III is fed into an aerated reactor 52, where hydrogen sulfide still dissolved in the filtrate is oxidized or swept out in a treatment step M. The hydrogen sulfide thus obtained is then transferred to a neutralization unit 54, where it is oxidized in a neutralization step N. This can be done e.g. in a reactor by aerating the hydrogen sulfide or passing gaseous ozone, $O_3$, through it and treating it with an oxidizing agent. Alternatively the neutralization unit 54 can take the form of a biofilter, in a manner known per se.

The collecting line 32 leads via a pressure relief valve, not specifically shown, into the neutralization unit 54 so that excess hydrogen sulfide passes into the neutralization unit 54, where it can be neutralized. The pressure relief valve opens in the direction of the neutralization unit 54 when a preset pressure is exceeded in the collecting line 32.

The washing acid freed of arsenic from the collecting tank 48 and the washing acid freed of hydrogen sulfide from the aerated reactor 52 are treated further in a nanofiltration stage IV and subjected to a nanofiltration, for which purpose the washing acid fractions are first combined here in a collecting tank 56. In the nanofiltration stage IV, heavy metals still present, such as zinc and iron in particular, are filtered out of the washing acid.

This is done by first passing the washing acid through a fine filtration unit 58 in a fine filtration step O, where a preliminary filtration is carried out. The solids that are filtered out here can be recycled via a return line 60 to the thickening step K of the sedimentation stage III, where they are fed into the sludge buffering tank 42. The filtrate obtained by means of the fine filtration unit 58 flows into a nanofiltration step P, where it flows through a nanofiltration unit 62; a concentrate obtained here is transferred to a collecting tank 64 and can be used e.g. for ore leaching.

In the nanofiltration, dilute sulfuric acid is obtained as permeate in a collecting tank 66 with a purity that allows it to be used in other processes. For example, the resulting sulfuric acid can be added to the water that is used as absorption medium in a sulfuric acid plant.

EXAMPLE

In laboratory experiments the method explained above showed outstanding results in respect of the separation of arsenic and copper in a washing acid containing sulfuric acid, without the stage IV comprising the nanofiltration. One of these results is illustrated below by means of the essential process steps:

1. Processing Step C 800 ml of washing acid containing sulfuric acid, with a copper content of $c(Cu)=220$ mg/l and an arsenic content of $c(As)=2710$ mg/l, were treated with 10 ml of 30% hydrogen peroxide, $H_2O_2$, at about 35° C., with stirring, and stirred for 60 minutes.

2. Copper Precipitation Step D

The washing acid was then treated for 70 minutes, at a dosage rate of 0.03 ml/min, with an NaHS solution having a concentration of $c(NaHS)=300$ g/l.

The washing acid obtained after the copper precipitation step D had a copper content of $c(Cu)=10$ mg/l and an arsenic content of $c(As)=2160$ mg/l.

3. Arsenic Precipitation Step H

An NaHS solution having a concentration of $c(NaHS)=300$ g/l was added to this washing acid over a period of 50 minutes at a dosage rate of 0.3 ml/min.

The washing acid obtained after the arsenic precipitation step H had a copper content of $c(Cu)<1$ mg/l and an arsenic content of $c(As)=770$ mg/l.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A method for separating arsenic and heavy metals in an acidic washing solution containing both arsenic and heavy metals, the method comprising:
   a separation stage in which arsenic and at least one primary heavy metal are separated from each other, wherein
   a) the separation stage comprises a processing step in which hydrogen peroxide is added to the washing solution; and
   b) the separation stage comprises a precipitation step in which a sulfide precipitating reagent is added to the washing solution in order to precipitate the at least one primary heavy metal as metal sulfide, wherein the result of the precipitation step is the metal sulfide and washing solution containing arsenic,
   c) the processing step being carried out before the precipitation step.

2. The method according to claim 1, wherein
   a) before the processing step, an analysis of the washing solution, at least in respect of the arsenic content, is performed in an analysis step; and
   b) hydrogen peroxide is added in stoichiometric proportion relative to the determined arsenic content of the washing solution.

3. The method according to claim 1, wherein
   after the precipitation step, at least one separation step is carried out in which the precipitated primary heavy metal is separated from the washing solution.

4. The method according to claim 3, wherein
   an intermediate containing primary heavy metal, obtained after the at least one separation step, is recycled into the precipitation step.

5. The method according to claim 3, wherein
   the washing solution obtained after the at least one separation step is freed of arsenic in an arsenic sedimentation stage.

6. The method according to claim 5, wherein
   the arsenic sedimentation stage comprises an arsenic precipitation step in which a sulfide precipitating reagent is added to the washing solution in order to precipitate the arsenic as arsenic sulfide.

7. The method according to claim 6, wherein
   after the arsenic precipitation step, at least one separation step is carried out in which the precipitated arsenic is separated from the washing solution.

8. The method according to claim 7, wherein
   an arsenic-containing intermediate obtained after the at least one separation step is recycled into the arsenic precipitation step.

9. The method according to claim 6, wherein the washing solution obtained after the at least one arsenic precipitation step is subjected to a nanofiltration in a nanofiltration stage.

10. The method according to claim 1, wherein hydrogen sulfide is liberated during the separation stage and is recycled as sulfide precipitating reagent into the precipitation step of the separation stage.

11. The method according claim 1, wherein hydrogen sulfide is liberated during the separation stage and is fed into a washing step where the hydrogen sulfide is converted to a sulfide precipitating reagent which is fed into the precipitation step of the separation stage.

12. The method according to claim 1, wherein the arsenic and the at least one primary heavy metal are separated in an acidic washing solution obtained in copper smelting.

* * * * *